United States Patent

Skjelmose

[11] Patent Number: 5,997,785
[45] Date of Patent: Dec. 7, 1999

[54] METHOD FOR THE MANUFACTURING OF A MOULDED BODY

[76] Inventor: Frank Ivan Skjelmose, Kirsebærvej 32, Næstved DK-4700, Denmark

[21] Appl. No.: 08/885,236

[22] Filed: Jun. 30, 1997

Related U.S. Application Data

[63] Continuation of application No. 08/507,407, filed as application No. PCT/DK94/00074, Feb. 22, 1994, abandoned.

[30] Foreign Application Priority Data

Feb. 23, 1993 [DK] Denmark .................. 0199/93

[51] Int. Cl.⁶ .................................................. B28B 1/26
[52] U.S. Cl. .................. 264/86; 264/122; 264/172.19; 264/294; 264/914; 162/145; 162/147; 162/181.1; 162/181.9; 162/189; 162/203; 162/206; 162/225
[58] Field of Search ................... 162/145, 147, 162/181.1, 181.8, 189, 203, 204, 205, 206, 224, 225; 264/86, 87, 101, 102, 109, 112, 113, 122, 172.19, 173.1, 175, 294, 344, 914

[56] References Cited

U.S. PATENT DOCUMENTS

| | | |
|---|---|---|
| 1,578,609 | 3/1926 | Mason . |
| 2,167,440 | 7/1939 | Mason ..................................... 162/206 |
| 4,966,739 | 10/1990 | Stipek et al. ............................. 264/122 |

FOREIGN PATENT DOCUMENTS

| | | |
|---|---|---|
| 85128 | 12/1935 | Sweden . |
| 1275042 | 5/1972 | United Kingdom . |
| 1405587 | 9/1975 | United Kingdom . |
| 1416321 | 12/1975 | United Kingdom . |

OTHER PUBLICATIONS

Haywood et al. (UK 1 416 321) (1975).

*Primary Examiner*—Jan H. Silbaugh
*Assistant Examiner*—Kenneth M. Jones
*Attorney, Agent, or Firm*—Factor and Shaftal

[57] ABSTRACT

A molded body is produced on the basis of a raw material, the main content of which is material which is left after remolding pulp from paper and extraction of fibers from the pulp mass for remanufacturing of paper. This raw material which mainly consists of water, short fibers, and fine, mineral particles is drained by pressing in a first pressing stage between filter belts for production of a coherent body, is dried partially in a first drying stage is pressed and in a second pressing stage, and dried finally in a second drying stage. The invention concerns a similar method for separation of fibers and particles from waste water which results from repulping paper and reclaiming of fibers from the pulp mass for remanufacturing of paper, whereby an enviromental problem is solved in a very suitable way. A plant for manufacturing of a molded body on basis of the raw material mentioned comprises a largely horizontal filter unit (3, 25) for draining, a first pressing unit (7) for pressing the material between surfaces of filter belt, a first drying unit (8) for drying of the material, a second pressing unit (10) for pressing the material, and a second drying unit (11) for heat treatment of the material.

13 Claims, 8 Drawing Sheets

METHOD FOR THE MANUFACTURING OF A MOULDED BODY

This is a continuation of Ser. No. 08/507,407 filed Aug. 21, 1995, now abandoned, which is a national phase application of PCT/DK94/00074 filed Feb. 22, 1994.

BACKGROUND OF THE INVENTION

1. Field of the Invention

The present invention is related to a method for the manufacturing of a moulded body on basis of a raw material which is the material left after remoulding pulp from paper and extraction of fibres for manufacturing of paper, which rawmaterial in principle contains water, short cellulose fibres, and fine, mineral particles.

The invention concerns additionally a moulded body produced by this procedure and a plant for exercising the method.

2. Background Art

From GB patent specification No. 1 275 042 is known a method for utilizing papermud for producing a board-shaped product or a mouldable mixture. The raw material used is papermud, i.e. an aqueous suspension which passes through the filter belt when cellulose pulp is manufactured in a fourdrinier apparatus for the manufacturing of paper. To this raw material which contains short fibres and inorganic minerals is added fibres of middle-length within the interval $\frac{1}{16}$"–5" (1.6–127 mm), and it is concentrated by passing a rotating, perforated roller, and is layed out in a filter belt press which produces an endless fibrous length. This material can after pressing and drying be used as filling material in board-shaped products. Boards of higher strength may be obtained by adding cement, gypsum or adhesives to a liquid mixture.

From GB patent specification No. 1 405 587 is known a development of this technique, where the aquous suspension is layed out on a support permeable to liquid, in the form of an endless filter belt and pressed through a set of rollers with gradually narrower gaps to force out the water. Hereby is produced a layer having some wet strength, which can be formed under pressure and heat. It is noted that the mould may be perforated so as to let water escape while the body is kept under pressure and heat, and it is noted as a second possibility that in between the surface of the mould and that of the body may be inserted a flexible tissue which may be founded on to the surface of the finished body. Adhesive substances are added to the raw material as required. The heat founding can for example be carried out at 160° C. at a pressure of 37 kp/cm$^2$ and a residence time of 15 minutes. The finished product has a moisture content of approx. 15%.

In GB patent specification No. 1 416 321 the same inventors describe a similar process and in that patent explain that the flexible tissue which can be inserted in either one or both sides of the body during pressing has the function of keeping the material together in the mould and to make it easier for liquid or steam escape from the body.

From Swedish patent specification No. 85 128 it is known to produce boards from paper pulp according to a method comprising shaping, pressing, drying and, finally, hot-pressing carried out at gradually increasing pressure. It is explained that the last pressure step is initiated when the boards actually begin to warp. The specification also states the fact that vegetable fibres contain water, partly as moisture in the holes of the wooden cells and partly absorbed by the fibres and stays there also after air-drying. It is also noted that in the hot press it is suitable to place a wire netting on one or both sides of the board for easier steam exit. This, of course, causes hobbing of a corresponding pattern into the board surfaces. If the wire netting is not used, the moisture content to be removed during the hot pressing, can practically escape only via the border slit, which results in a very long pressing time, and the process will be unrealistic except for the production very small board sizes.

Within the woodworking industry it is known to produce particle boards by producing a liquid slurry from crushed wooden fibres, water and glue in a filter curtained press and to later on harden the particle boards in a hot press. The required pressure is very high and a considerable quantity of glue is used to achieve a continuous unbroken board with a suitable density. Steam explosion of the boards is a very important factor which has to be overcome by keeping a high pressure for a comparatively long period of time, during which the boards are allowed to dry and the glue is hardened. As hot press is a rather high initial investment, and as the press is occupied for a quite long time per board, depending on the thickness of the board, the pressing operation will represent an important part of the production cost.

From U.S. Pat. No. 1,578,609 it is known to produce thin wood fibre boards according to a process where wood chips are crushed and softened under heat treatment and subsequently pressed. According to that professional process, the softened chips are pressed at very high temperatures in a press in which a filter net is inserted on one side so as to allow steam and water to escape during the pressing. These boards, which are known under the commercial name Masonite, are produced without glue but kept together only by the natural content of lignin from the wood chips. The filter curtain causes the hobbing of a pattern on one side of the manufactured boards.

It is known to produce Masonite boards which are smooth on both sides. These are produced after the above mentioned method but before the boards are completely dried the boards are pressed in a press with smooth pressplanes. The press is further equipped with heated planes and the temperature is preset to a temperature where the lignin in the Masonite board melts and a Masonite board with smooth surface is produced.

SUMMARY OF THE INVENTION

This invention is based upon the raw material which remains as waste water after reprocessing of recoverable waste paper for manufacturing of the well known recycled paper. The invention is especially relevant in connection with the reprocessing of recoverable waste paper which contains large quantities of mineral fillers, such as office paper and other high quality printed paper. In the reprocessing, the paper is processed mechanically, treated with heat, water and chemicals, and purified so that the pulp mass is prepared. The pulp mass goes through the deinking process, whereby the ink is removed in a flotation process, and the purified pulp mass is used for production of paper in a machine designed for this purpose such as a fourdrinier press, by which the cellulose fibres are retained by the filter belt except for the short fibres. The aqueous suspension running through the filter belt contains minerals and very short cellulose fibres, substantially fibres being less than 1 mm long. The amount of solid matter in the recoverable wastepaper, which can be extracted in this way for production of new paper may with prior art technique today amount to 60–65%.

The remaining waste water from paper production includes a aqueous suspension having a content of dry matter of approx. 1–5 weight % and particularly approx. 2 weight %, out of which approx. half of the dry matter content is cellulose fibres and the other half fillers including clay, kaolin and chalk and others. Cellulose fibres are tube-shaped cells made of long cellulose molecules and somewhat shorter hemicellulose molecules.

The suspension is considered to contain no noticeable lignin because the paper which is manufactured is considered to be originally produced from a pulp mass from which the lignin, which might have been entered from the raw wood, has been removed to obtain the desireable quality of the paper.

The described waste water inevitably appears in very large quantities in the reproduction of high quality paper, and disposal of the waste water represents considerable expenses because of the heavy quantities even after the quantiative reduction which can be obtained by concentration of the mud. It is usual to concentrate the mud by filtration whereby a product having a water content of approx. 30–50% may be obtained. The treatment of the waste water and the disposal of the mud still represents considerable expenses which even must be expected to increase in time. Combustion of the solid substances in the waste water is not economical because of the considerable content of water and incombustable substances such as chalk, clay and kaolin. Attempts to use the substances as building materials up till now show that it is necessary to mix binding agents of one sort or another to manufacture products having a strength that makes them practical. Binding agents however represent an increased expense.

After experiments with this method known from the GB patent specifications stated above, it has been found that the known method has certain limitations and disadvantages. In the instance where a netting is used in the press mould a pattern will be hobbed on the surface of the finished board, which cannot easily be smoothed. On the other hand it has been experienced that pressing between smooth pressing planes causes problems with steam explosions in the boards especially in larger sizes at the moment of decompression, because the moisture cannot escape during the pressing. Perforation of the presssing planes is not a practical solution because the perforation quickly will be clogged. By pressing between smooth planes the water can actually only escape through the edges of the board, which in the case of larger board sizes takes too long time and makes the process uneconomcally practicable. By pressing the material between smooth planes there is also a certain risk of the material shattering due to an internal hydraulic pressure.

By thoroughly drying the boards before pressing them, it has turned out that the boards have a tendency to warp during the drying process, and that it is not possible to level the warping by subsequently pressing with a view to the density and shape desired, because the dried boards show a tendency to crushing and to reestablishing their elastic shape after pressing. On the other hand it has turned out that by cold pressing the material before it is dried, it is not realistic to decrease the water percentage to lower than 35–41%, which after drying leads to the finished boards showing a lack of density and strength for application as building materials.

However, it has been discovered that a moulded body can be manufactured on the basis of the raw material mentioned introductorily, by a procedure which comprises draining of the raw material by pressing it in a first pressing stage between filter belts for production of a coherent body, drying it in the first drying stage until practically all free water has been removed from the body, whereas the water in the fibre walls in the cellulose fibres contained in the body are on the whole retained, brief pressing with no further heating of the partially dried body in a second pressing stage, and heat treatment in a second heating stage.

Surprisingly, it has turned out that this method will result in moulded bodies such as boards having a controllable shape, density and strength and having characteristics of moisture absorption, swelling, clinched and riveted, dimensional stability, acoustics muffling, etc. which are better than ever possible up till now.

Particularly, it is found to be surpising that a board of acceptable strength can be manufactured from a raw material of very short cellulose fibres with an extensive content of inorganic particles without adding binding agents. This is obtained by a procedure which is reasonably economical, as the presses are occupied for a comparatively short time per board. The new method requires a comparatively longer treatment period for drying, which is, however, no real disadvantage as drying space and drying kilns can be installed fairly cheap, having the neccessary capacity. Without limitation of the invention, it is supposed that a good result can be explained by the following conditions of the raw material.

The material contains a considerable amount of cellulose fibres which consist of tube-shaped, hollow cells, of which the cell walls consist of molecules of cellulose and hemicellulose. The cellulose molecule is a chain molecule mainly consisting of glucose molecules i.e. ring molecules with six carbon atoms in each ring whereby each cellulose molecule includes 3000–10000 glucose units. The surfaces of the cellulose molecules are electrically neutral. In between the cellulose molecules there are hemicellulose molecules which are polysaccharides or chains of sugar molecules but with a far lower content of nuclei per chain than the cellulose molecules. The nucleui in the hemicellulose may be hexosanes or pentosanes, and they are different in both cases from the nuclei in the cellulose molecules by having free hydroxyl groups on the surfaces. The free hydroxyl groups on the surfaces of the hemicellulose molecules are electrically charged and they grant to these molecules a higher water absorbing effect and make the cellulosecells capable of binding an atomic layer of water molecules on the surface by what is known as sorptional binding. The amount of water, which can in this way be bound to the walls of the cellulose fibres amount to 20–35%, particularly 25–30% dependent of the wood species, especially approx. 28% of the dry weight of the cellulose fibres. This content of water is called the fibre saturation point. These water percentages can be expressed as percentages of the total content of dry matter if the parts of the cellulose fibres of the total dry matter content is known. If the cellulose fibres amounts to 50% of the total dry matter content, the corresponding water percentages will amount to 10–17.5% especially 12.5–15% and more especially approx. 14% of the dry weight of the total dry matter content.

Additional water cannot bind to the cellulose fibers' cell walls, but can be bound in the material as a whole by capillarity either in the cavities in the tube-shaped cells or in the spaces outside the cells. This water in not so tightly bound, and it is therefore called free water. By drying of the cellulose fibres, at first the free water vanishes and then the water which is sorptively bound in the cell walls. Hemicellulose is less stable than cellulose and can be demolished by heat treatment sooner than the cellulose molecules, because the hemicellulose transforms into shorter polymers which are not moisture absorbing.

From experiments it seems that the content of sorptively bound water is crucial to the deformability of the cellulose cells, so that cells whose walls are saturated with water can be deformed mechanically and show memory of the deformation, i.e. the deformation is plastic, whereas cells whose walls are dry, are stiff and react to mechanical treatment by crushing or by purely elastic deformation.

In the first pressing stage according to the invention, it is assumed that the majority of the water, which lies freely outside the fibres, is driven off, whereas the free water within the hollow cellulose cells is hardly driven off, and even less the water which is sorptively bound in the cell walls. Here it is noted, that there are bounds as to how high pressure can be applied as the relatively aqueous substance has a limited strength, and thus there may be a risk of the substance exploding due to the internal hydraulic pressure.

In drying stage I, all the free water between the cells and in the cell cavities is dried, but drying stage I should not continue for so long that the sorptively bound water is removed. This means that the after drying stage I the substance should have a content of moisture of approx. 20–35%, preferably 25–30% and especially around 28% of the dry weight of the cellulose fibres in the substance. Because of the heavily absorbent effect of the hemicellulose on water amounts up to the stipulated limits, the fibre cells will absorb all free water until their point of saturation is reached, which is called the fibre saturation point. By organizing drying stage I like that it can be accomplished that the cavities in the fibre cells of the substance will be empty whereas the cell walls will still be soft and plastically deformable.

By renewed pressing in pressing stage II, it is therefor possible to further compress the boards according to these cavities, and the boards will because of the plastic characteristics of the fibre cells retain the deformation granted to them during pressing stage II. As there is no noticeable water to be removed during pressing stage II and there is no noticeable heat to be supplied, this pressing can be carried out for a short period of time and with smooth pressing planes. The finished boards will hereby have smoother surfaces because possible planes hobbed by the belt of press I will at least partially be levelled out. Furthermore, the boards can be made plane as the possible warping after drying in kiln I can be removed.

After this, the boards are heat treated in drying stage II, whereby the sorptively bound water is removed and the fibre cells lose their plastic deformation ability whereby the shape and dimensions are stabilized. It has been discovered that the tendency of the boards to warp during this stage is minimal, which can be explained by the reduced content of water to be removed during this stage. During drying stage II the boards are dried (this means drying till a water content of approx. 3–4% according to the weight of the cellulosefibres), after which the hemicellulose is demolished to shorter molecules which are not absorbant. This particular hardening treatment makes the boards practically non-absorbing. By inducing heat to the board sides, the hardening process begins on the surfaces and spreads gradually towards the centre of the board. By controlling the hardening time it is possible to produce boards which have only hardened on the surfaces, or boards which have hardened to different extents.

Although, for simplicity the term drying stage II is used, it has to be mentioned that the corresponding treatment of the boards is not only a drying treatment but could also have been describeded as a heat treatment as. According to an appropriate embodiment, the first drying stage is accomplished by storing the boards in open air. Experiments have shown, that the needed drying can be achieved within 5–7 days, and it has turned out to be comparatively easy to control the degree of dryness, in that by natural drying, the boards are inclined to stabilizing at exactly the degree of dryness aimed at after the first drying stage.

According to another appropriate embodiment, the first drying stage can be achieved by ventilated heating, whereby drying is obtained faster.

According to the invention, a moulded body is produced by the method according to the invention. This body obtains so good strength and dimensional stability that it is applicable as construction elements e.g. wallplates or block boards, whereby it offers the essential advantages of being incombustible, non-toxic by influence of fire, non-absorbant, dimensional stability, clinched and riveted, acoustic muffling, and it has a good strength and mechanical manufacturing characteristics.

A plant for exercizing the method according to the invention for the manufacturing of a moulded body obtained on the basis of the above mentioned raw material comprises a first press for pressing the substance between planes, having a filter belt and a first drying system for drying the substance, and a second press for pressing the substance, and a second drying system for further drying of the substance. Hereby a plant is obtained which can use the wastewater that will inevitably result from paper production on the basis of recycled paper and whereby there can very appropriately be produced moulded bodies, which can for example be used as construction elements.

Further appropriate embodiments of the invention are set out in the dependent claims.

BRIEF DESCRIPTION OF THE DRAWINGS

The invention will appear more clearly from the following detailed explanation of specific embodiments, with reference to the drawing, where.

All figures are sketches and are not drawn to scale, and they only show the details necessary for the comprehension of the invention while other details have been excluded. The same components are all figures indicated by the same reference number.

BEST MODE FOR PRACTICING THE INVENTION

Figure 3:
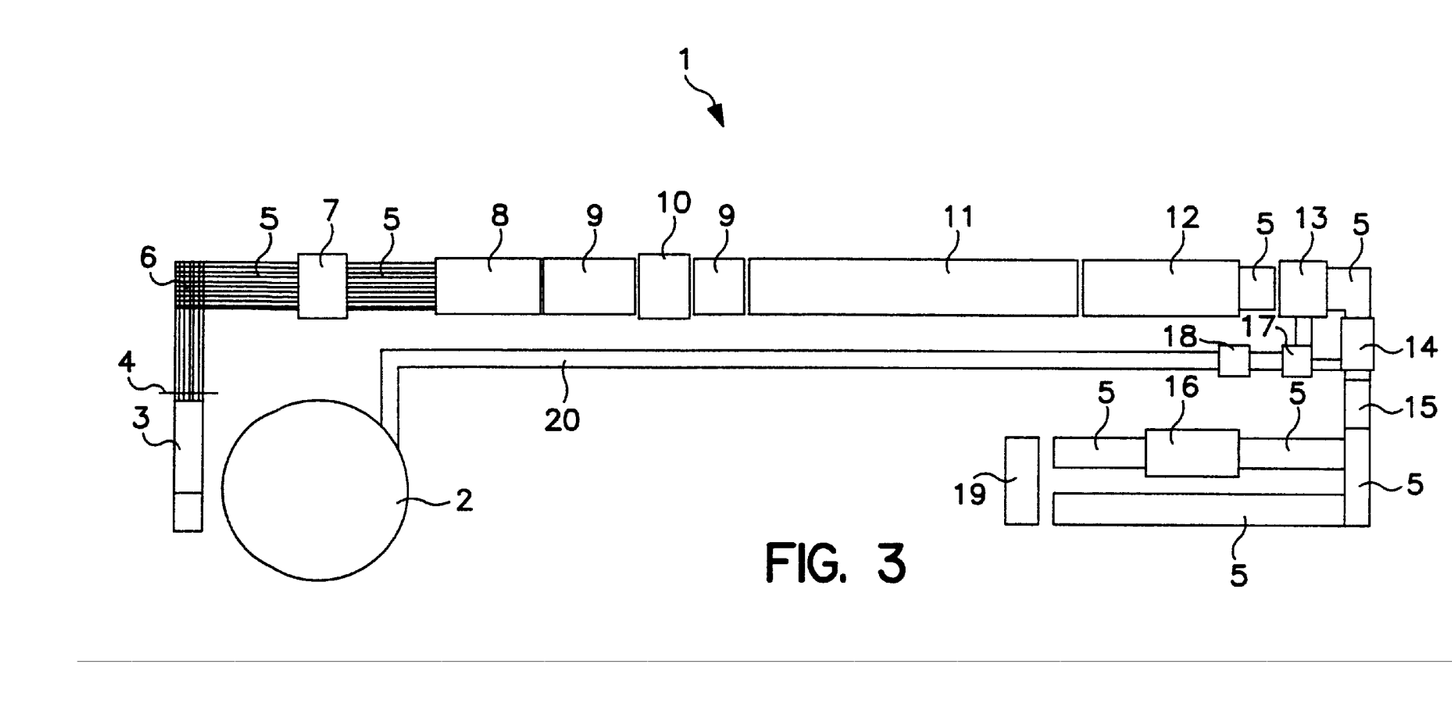
FIG. 3 shows a plan of the plant.

The specific design of the production plant according to the invention is described initially in that the first reference is to the total plane view in FIG. 3. The plant of FIG. 3, which as a whole is indicated by the reference number 1 is organized in a such way that it is able to receive the raw subtance in either fluid or solid form, whereby the manufacturing processes will be referred to as the wet process and the dry process, respectively. Raw material in fluid form is supplied to the buffer tank 2, in a manner which is not shown in detail, which is a watertight tank of a suitable size, from which the raw material is supplied to the filter belt press 3 shown to the left of FIG. 3, in a flow which can be dosed as required, in a manner which is not shown in detail. Raw material in solid form is passed to the hammer mill 35, shown to the left of FIG. 3. The hammer mill crushes the material and supplies it to the filter belt press 3.

In the filter belt press the material is spread in a horizontal layer, which is drained of water and is compressed in a continuous process whereby the filter belt press produces and delivers a continuous fibre length 22 (cf. FIG. 1) of a substance with a certain coherence. After the filter belt press a cutting machine 4 is arranged, which can be arranged with a rotating saw blade or in another suitable way so that the lengths can be cut transversly to the conveyance direction. In this way, the continuous length can be cut into boards or board elements of appropriate length. From the cutting machine the boards are passed on conveyance means 5 such as rollers or conveyor belts, to a table for weighing 6, where each single board is weighed and checked at this stage of the process. From the table for weighing 6, the boards are passed on to the conveyor belt 5, cf. FIG. 3, in a direction which is swivelled 90° compared to the direction from the filter belt press to the table for weighing.

The board elements are fed into press I, which is indicated by the reference number 7, where they are compressed with the purpose of driving off additional water. After the pressing operation in press I 7, the boards are passed on conveyor belt 5 to kiln I which is indicated by the reference number 8, where they are heated so as to dry. After the stay in kiln I, the boards are passed on through a heat insulated roller tunnel, which is arranged so the boards give off as little heat as possible to the surroundings.

From the roller path tunnel 9 the boards are fed into press II which is indicated by reference number 10, where they are again compressed. After the pressing operation in press II 10, the boards are passed through a heat insulated roller path tunnel 9 to kiln II which is indicated by the reference number 11, where they are additionally dried, and from where they are fed into a cooling tunnel 12 to be chilled.

After the cooling tunnel, the boards are on a conveyor belt 5 passed to an edge cutting machine 13, where the edges are trimmed and cut to dimensions by suitable cutting tools as for instance rotating saw blades. From the edge cutting machine 13 the boards are passed on to conveyor belt 5, where the direction of conveyance is again turned 90°, so the end edges can suitably be trimmed at the final cutting machine 14 which is arranged in a way similar similar to that of edge cutting machine 13. From the final cutting machine 14 the boards are passed on to the finishing machine 15, where the surfaces are finished and polished. From here the boards can be taken on two parallel paths: one through a chamber 16 where the boards are surfaced, and the other on conveyor belt 5 directly to the stacking unit 19, where the finished boards are stacked with a view to being carried on pallets to the storage facility.

The remainders from the cutting at cutting machine 13 and 14 as well as dust from the finishing machine are collected together and taken to a waste collector 17 which may be supplied with a spiral compressing and conveyor unit, and is passed on to the waste grinder 18, where the remainders are crushed to a size which after mixing with water can again be used as raw material for board manufacturing. The waste grinder can be supplied with rollers or blades, it can be a grinder or a shredder, or it can be arranged in another technical manner. From the waste grinder 18, the renders are on a waste conveyor 20, a conveyor belt, taken back to the buffer tank 2.

Water which is drained from the boards or is pressed from the boards during the manufacturing process, is collected and carried off or carried back to the buffer tank 2 in a manner which is not shown in detail, if necessary after cleansing, so that water or the muddy part of the water can be treated in a controllable way or perhaps be recirculated at an earlier stage of the production. The whole plant is imagined to be dimensioned to a production capacity in the order of one finished board per minute, the board of a size of 1.25 m×2.5 m×10 mm and a weight of approx. 37 kg. In the wet process in which the raw material is received as an aqueous suspension with a content of dry matter of approx. 2–5%, this means that the plant processes an aqueous amount of raw material in the order of 740–1850 kg per minute. In the dry process, in which the raw material is received as a losely coherent substance having 50% water content, the input amount is approx. 74 kg granulate per minute.

The plant is arranged so that boards of different dimensions and thicknesses can be produced by suitable, professional adjustments. The thicknesses af the boards can generally be adjusted within the interval of 1–20 mm. Thicker boards are also possible, if a longer production time is acceptable.

Figure 4:
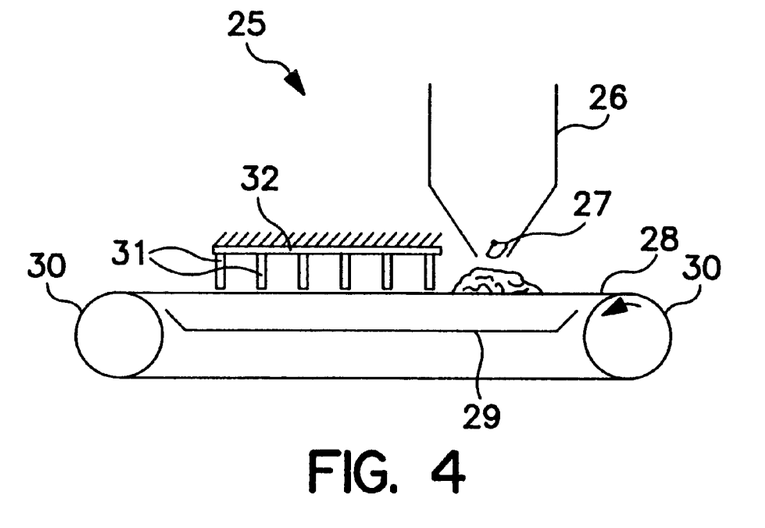
FIG. 4 shows a side elevation of the draining plant.

Reference is now made to FIG. 4 for a more detailed description of the draining unit 25. The purpose of the draining unit 25 is to receive a very diluted, aqueous suspension the dry matter content of which can be approx. 1–5%, preferably approx. 2%, in that the draining unit ensures the first drainning of the material. As shown in FIG. 4, the unit includes mainly a funnel 26 into which the aqueous suspension is fed. The funnel has an outflow at the bottom, which can be adjusted by an outflow regulating device 27, so the outlet amount can be adjusted in a controllable way.

Aqueous suspension is passed through the outflow of the funnel on to an endless perforated belt 28 which passes around the belt rollers 30, so that the upper course of the belt is more or less horizontal. The perforated belt retains solid components and permits water to drop through the belt, whereby it is collected in a collection tray 29 in order that it can be disposed of or recirculated in a controllable way.

Above the perforated belt 28 is arranged a number of vertical spreading gears 31 which are installed on a holder 32 which is arranged at some distance above the belt and being more or less parallel to the belt, in that the spreading gears are set at right angles towards the belt. Spreading gears may be made of steel, having a cross section of 10×50 mm and they can have a length of approx. 150 mm. Spreading gears are spread over the surface of the belt lengthwise and transversely having a horizontal average distance of approx. 100 mm. The gears reach downwardly to a distance above the belt in the order of 1–15 mm. When the belt 28 moves as shown by the arrow of FIG. 4, the material is brought towards the left of the figure and the fixed spreading gears 31 will help to spread and mechanically prepare the fixed material which lies on the belt. The fixed and partially drained off material falls off the belt 28 to the left FIG. 4 when it still has a considerable content of water and when it is mechanically non-coherent.

Figure 5:
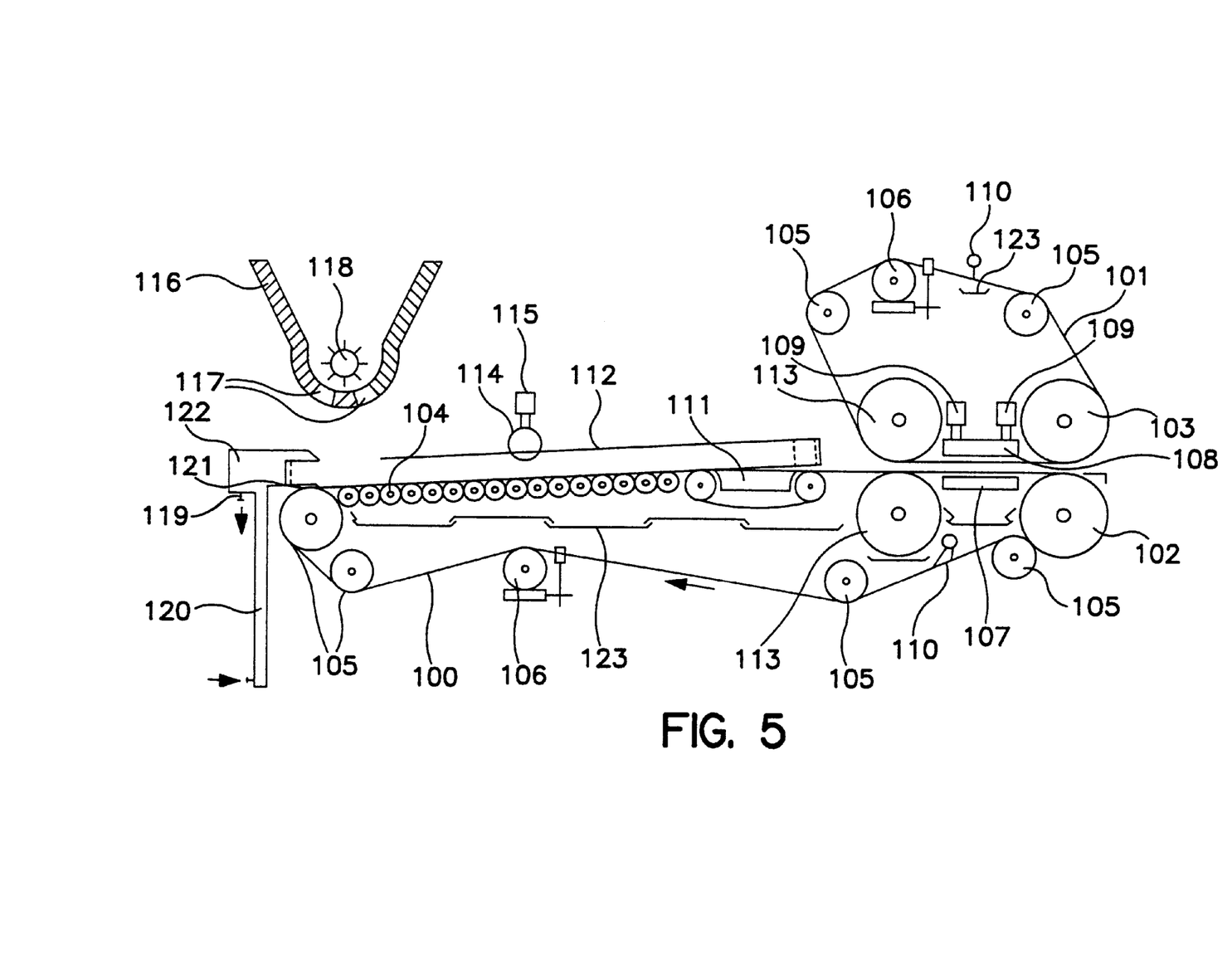
FIG. 5 shows a side elevation of the filter belt press.

Now reference is made to FIG. 5 for a more detailed description of the filter belt press. The filter belt press 3, which may be of the make Andritz, is designed to receive partially drained material from the draining unit 25 or crushed material from the hammer mill 35, respectively, whereby in both cases the input material is passed through a charging funnel 116 from which the material can drop through outflow openings 117, which are arranged in the bottom of the charging funnel spread across the width of the belt whereby a distributor rotor 118 having an axis transversely on the drawing plane in FIG. 5 helps to spread the material evenly transversely and force it through the outflow openings. The material drops into the collecting tray 122 which is shaped as a vessel which is open upwardly and to the right of FIG. 5. In connection with the collection tray is arranged an overflow 119 and a discharge tube 120 in a way that can maintain a controlled level of liquid and whereby the liquid can be drawn if necessary. From the collection tray the material flows down on to a table for shaping 121 which is made of a material having suitably low friction, for example a plastic coating, and which slants a little upwardly from the collection tray 122 towards the filter belt 100, which is a main element of the filter belt press.

The filter belt 100 is made as an endless length of filter tissue, which is passed over the so called table rollers 104 around a lower driving roller 102 and around the guide rollers 105 and a belt controlling device 106. The fineness of the filter belt is approx. 14–32 mesh (meshes per linear inch) and preferably approx. 20 mesh. The thickness of the thread is preferably approx. 0.3 mm diameter. In a preferred embodiment, the filter belt is metallic in that the longitudinal threads are made of phosphor bronze and the transverse ones of brass. In another preferred embodiment the filter belts are made of plastic as for instance polyamide or are plastic-coated. Liquid can be drained off through the filter belt because water that traverses will be collected in trays 123, in order that it can be disposed of or be recirculated in a controlled way. The filter belt passes by a washing nozzle 110 where it can be flushed from the reverse whereby sticky impurities can be removed. The belt controlling device 106 ensures that the belt is properly tightened and that it runs straight in that the length controlling device can smooth out all tendencies of skewness.

In the section of the filter belt which follows immediately after the shaping table 121, the belt is supported by table rollers 104, whereby that section of the belt slants upwardly. The upwardly slanting results in it that a certain level of fluid may exist in the collection tray 122 and over the first part of the filter belt whereby waterproof sideguards 112 are arranged at the sides of the filter belt. The sideguards are made in such way that they fit watertightly against the surface of the filter belt and that the width is adjustable within a certain interval of the preferred dimension which is 1300 mm.

Above the filter belt is arranged a doctor knife roller 114 height adjustable by means of an adjustment actuator 115 and which roller is foreseen for assuring that the solid material is spread in level across the filter belt in a thickness adjustable within the range 30–100 mm. Liquid has the possibilty to drop through the filter belt and down between the table rollers 104. As the belt moves towards the right of FIG. 5 across the table rollers, the liquid material is more and more like a continuous mat moving further towards the right of FIG. 5 on the filter belt. After the table rollers, the filter belt passes above a suction unit 111 where it is possible to produce a vacuum under the filter belt to obtain a stronger dewatering of the material.

After this, the filter belt passes through a set of pressure rollers 113. Above this area a so called pressing belt 101 is arranged in the form of another endless filter belt which runs on a driven toproller 103, guide roller 105, by a washing nozzle 110 and a belt control unit 106. The pressing belt or the top filter belt is generally of the same type as the lower filter belt, and the units in principal work in the same way according to the explanation given above.

In the area between the two pairs of pressure rollers 113 is arranged a lower pressing board 107 above which the lower filter belt 100 passes, and a top pressing board 108 under which the top filter belt passes below. The top pressing board is adjustable with regard to, height and inclination by the adjustment actuator 109. The system of a top and a bottom pressing board intends to assure that increasing pressure is imposed on the fibre mat manufactured with a view to draining of additional water. The pressing boards are manufactured from low friction material in order that the the filter belt can slide across them, and the boards may be plane or slightly curved as shown in the side elevation of FIG. 5 in order that the pressure is imposed gradually on the mat in the most suitable way and that the mat is compressed without becoming curved.

The pressing boards are in a preferred embodiment designed in such a way that the mat or the fibre length is compressed without becoming curved. By means of the adjustment actuators 109 the pressure and consequently the thickness of the mat prepared by the filterbelt press can be varied in a steplessly adjustable manner. In a preferred embodiment the filter belt press is designed so that the maximum pressure is freely adjustable within the range 0–25 $kp/cm^2$, and that the output thicknesses are variable within the range 12–20 mm. In other preferred embodiments, the filter belt presses may be constructed so as to be able to produce pressure up till 35 $kp/cm^2$ or up till 50 $kp/cm^2$.

Although it is not shown in the figures, the filter belts according to the invention can be supported by transverse support lamella that move at the same speed as the filter belts themselves, or the top and bottom pressing board can be foreseen for intermittent operation in such a manner that they will be displaceable over a certain distance together with the filter belts at the same time squeezing, whereupon they will open and return to the staring position. Thereby particularly high pressure may be obtained without the filter belt having to overcome noticeable friction during movement. On the contrary a certain discontinuity in the produced fibre length will have to be accepted when the pressing boards are used in an intermittent way. In another preferred embodiment the filter belts are mutually compressed between rollers that maybe arranged in such a way so the filter belts follow a waved course.

Even though drainage of material in a drainage unit and in a filter belt press is described, it should be stressed that there are other profesionally known methods of drainage, which might as well be used instead of the filter belt press or the drainage unit. Such methods include for instance decantation, centrifugation, vacuum filtration, sedimentation, pressing in a chamber press, etc. and these methods can be used in other embodiments of the invention.

Figure 6:
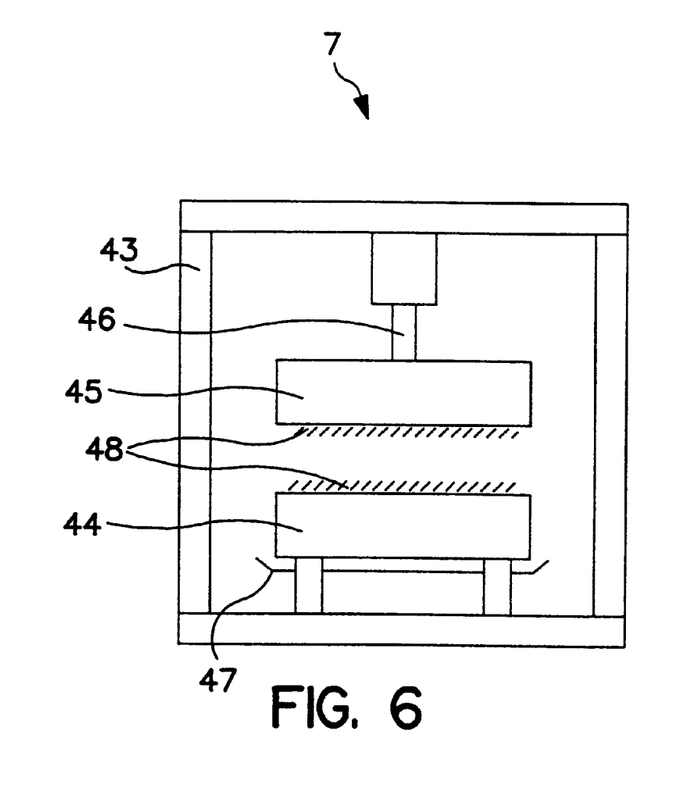
FIG. 6 shows a side elevation of the press I.

Now reference is made to FIG. 6 for a more detailed description of press I 7. Press I which could be of the make Sennerskov comprises mainly a frame 43 in which is installed a lower press plane 44, by which an actuator 46 supports an upper pressing plane 45 in such a way that the two pressing planes can be pressed against each other. On the surfaces of the lower and upper pressing planes 44 and 45 there is a net 48. The nets can be woven of steel wire or synthetic material and have the effect that water may escape from the surfaces of the bodies which are being pressed, whereby it has the possibility of leaving the press, whereupon it is collected in the tray 47 in order that it can be disposed of or recirculated in a controllable way. The nets also have a cohesive effect on the pressed board bodies, the cohesive effect being important as during the pressing procedure so high pressure may arise in the boards, that the boards show a tendency to bursting or skidding out. The actuator 46 is arranged in such a way that the pressure can be controlled, in that the press and the actuator are mainly arranged for adjustment of the pressure from 0–60 kp/cm$^2$ of the board being pressed.

In a preferred embodiment, press I is dimensioned for pressing one board of approx. 1.3 m×2.6 m, the press being arranged in such a way that it can develop a total pressure of approx. 2,000 tons. In another preferred embodiment, press I is dimensioned for pressing two boards which are placed next to each other, the boards each have a size of approx. 1.3 m×2.6 m, and in this embodiment the press is dimensioned for a total pressure of 4,000 tons.

Whereas press I in the embodiment shown has leveled pressing planes suitable for producing boards having plane parallel sides, press I can also in other embodiments be arranged with shaped, non-plane pressing surfaces, whereby bodies of other shapes can be produced.

Figure 7:
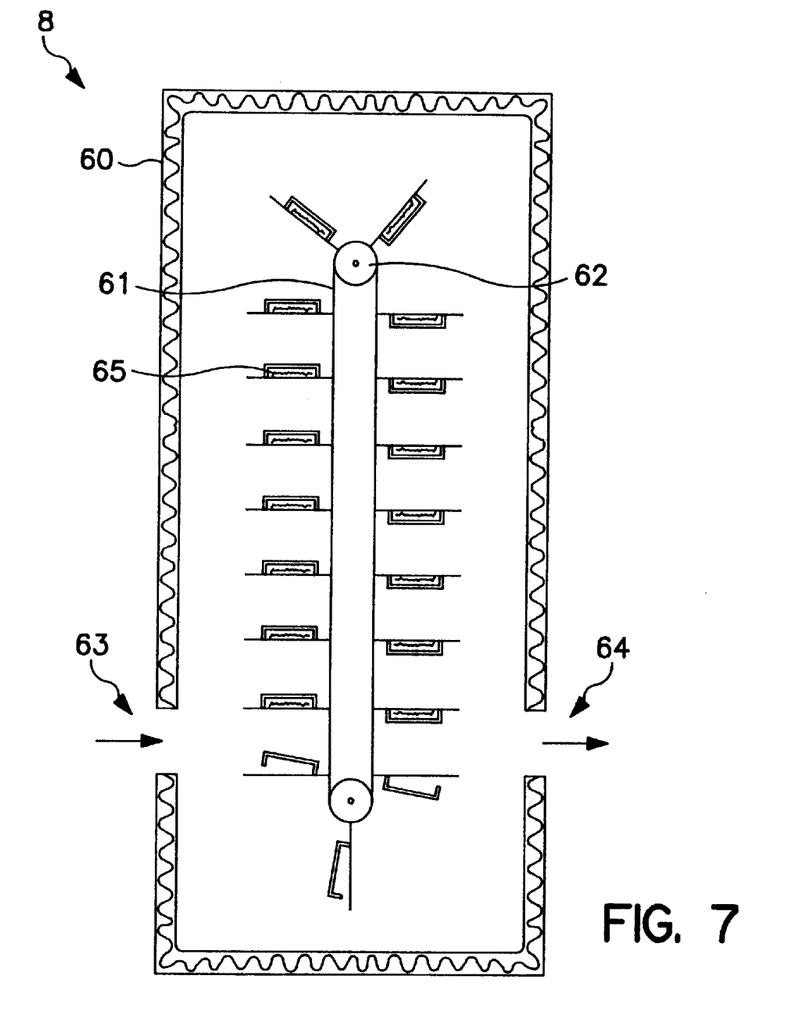
FIG. 7 shows a side elevation of the kiln I.
Figure 8:
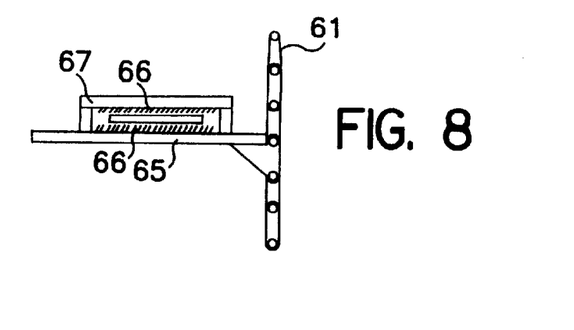
FIG. 8 shows a side elevation of a detail from kiln I.

Now reference is made to FIG. 7 for a more detailed description of kiln I. Kiln I 8, mainly comprises a heat insulating shell 60, in which is arranged a system of vertically running chain conveyors 61 surrounding the chain rollers 62 at the bottom and at the top. On the chain conveyors 61 is arranged in a right angle protruding supports on which a supporting net 66 is arranged, in that the arrangement is shaped so that a board body 21 in a means of transportation, which is not shown in detail, can be passed through an entry opening 63 in kiln I and is placed on a supporting net 66 on a protruding support 65. On each protruding support 65 is arranged a hinged holding frame 67 having an additional supporting net 66, which holding frame can be closed around the board body 21 so that the board body is fixed at a reasonable surface pressure of approx. 0.01 kp/cm$^2$, cf. FIG. 8 which shows an enlarged sketch of a protruding support. The cross-sectional dimension of the meshes of the supporting net 66 may be approx. 3–10 mm. This arrangement has the objective of supporting the board, in order that it will not be liable to warping or falling apart during the drying process in kiln I.

The support of the boards can alternatively be carried out by other means as e.g. perforated boards whereby the essential feature of the invention merely is that the boards are supported in such a way that vapour can escape from the surfaces of the boards. In an alternative embodiment the boards are let into kiln I freely on a level supporting surface, without being fixed.

With reference to FIG. 7, the kiln is in principle built vertically containing a number of boards to be supported and fixed individually while moving upwards through the kiln and around the top chain roller 62 and down on the other side until they after opening of holding frame 67 can be taken out and transported further through the outlet 64. Although FIG. 7 shows a limited number of boards, it has to be understood that the practical embodiment may contain a large number of supports and holding frames e.g. so that the kiln I can contain up till 100 boards spaced a few centimeters from each other, e.g. 10–30 mm. Kiln I is arranged with adjustable temperatures up till 220° C. The time in kiln I is adjustable by adjustment of the speed of the conveyor chain 61.

Figure 9:
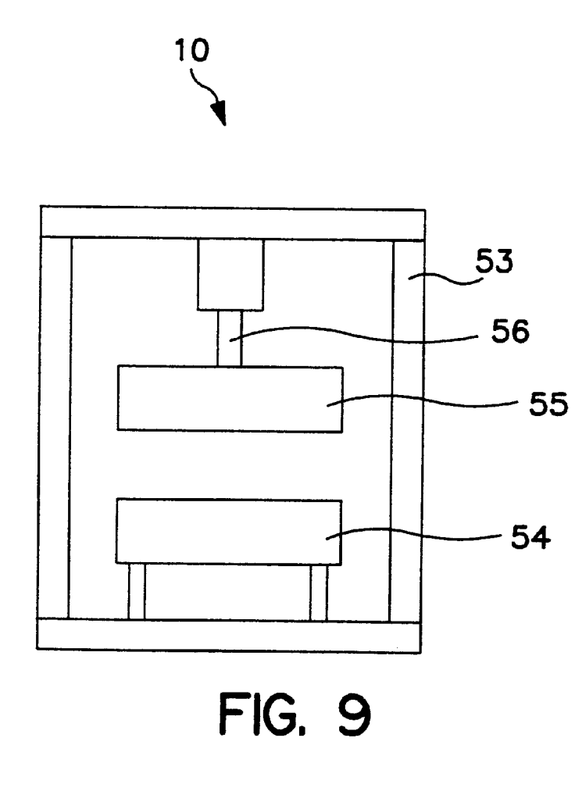
FIG. 9 shows a side elevation of the press II.

Reference is now made to FIG. 9 for a closer description of press II. Press II which can be of make Sennerskov mainly comprises one frame 53 which supports the bottom pressing planes 54, and by an actuator 56a top plane 55. Press II is arranged in such a way that the pressing planes can be brought towards each other while they are kept parrallel with high accuracy and at a controllable pressure. Press II is suitably arranged so that the pressing planes are heated to a controllable temperature which is adjustable up till 230° C.

Press II is preferable arranged so that a board of size 1.3×2.6 m. can be pressed at a pressure adjustable up till 60 kp/cm$^2$ corresponding to a total pressure of 2,000 tons. In another embodiment press II may be arranged for pressing two boards of size 1.3×2.6 m placed next to each other. In that case, press II is arranged for a total pressure of 4,000 tonnes in order that a pressure in the order of 60 kp/cm$^2$ may be imposed on the board bodies.

Press II in the outline corresponds to press I, but it is different in that it has sooth pressing planes. Water can therefore not escape from the pressed boards except for the water which may escape in horizontal directions along the board. As press II has no supporting net on the pressing sufaces, it is important that the boards being pressed have a cohesive strength if they are not to be blown up by the hydraulic pressure arising in the boards during the pressing.

While the pressing planes in the first embodiment of press II are smooth, they are according to another suitable embodiment arranged with a slightly raised edge (not shown) the purpose of which is to keep the boards together during the pressing. This edge is arranged in such a way in relation to the boards to be produced that the line hobbed by the edge, in the boards will be in the areas to be cut away when during the subsequent processing the board is trimmed to dimensions. In other embodiments press II may be arranged so that the pressing surfaces have reliefs or other non smooth shapes whereby bodies of corresponding shapes are produceable.

Figure 10:
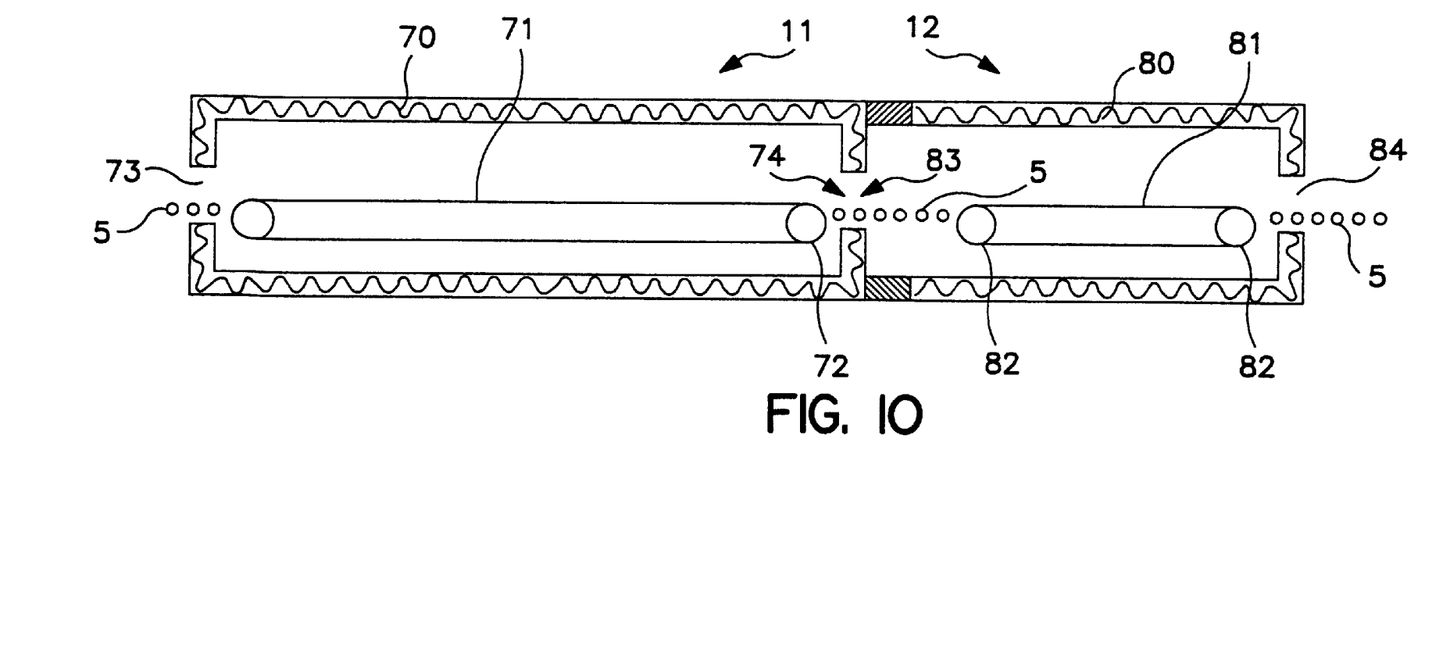
FIG. 10 shows kiln II and the cooling tunnel.

Now reference is made to FIG. 10 for a more detailed description of kiln II and the cooling tunnel. Kiln II 11 mainly comprises a heat insulating shell 70 and a longitudinal conveyor belt 71 which is passed around belt rollers 72 at the inlet opening 73 and at the outlet opening 74. Kiln II is arranged so that the temperature can be adjusted in the range up to 220° C. The residence time in kiln II can be adjusted by adjustment of the speed of conveyor belt 71.

After the stay in kiln II, the board bodies are passed through the outlet opening 74 over a short conveyor belt 5 into the cooling tunnel which comprises a covering shell 80 and a conveyor belt 81 which is passed around belt rollers 82 at the inlet opening 83 and the outlet opening 84, respectively. In the cooling tunnel 12, air is blown in at ambient temperature with a view to cooling the boards before further processing.

Although kiln I and kiln II are in the preferred embodiments realised as a vertical construction and a horizontal construction, respectively, it should be noted that other embodiments are possible. For example, both kilns may be built vertically or both kilns horizontally, or they may be built in other professional ways, which can fullfil the same functional requirements and which are consequently applicable in the implementation of the invention.

According to another very appropriate embodiment natural drying during drying stage I is applied instead of forced drying. In that case the boards are taken from press I 7 to a storage in open air (not shown) preferably under a roof where they are left for a suitable time in such a way that there is open air circulation and from where they are passed later on taken into press 2, 10, for further processing. By practical experiments it has turned out that desirable drying degree can be obtained after 5–7 days of drying in open air and that there is thereby obtained considerable energy reduction, in that comparatively heavy quantities of water have to be removed during drying stage I. As explained earlier, the boards can rather easily liberate the free water existing between the fibres and in the fibre cavaties, whereas the water which is sorptively bound in the cell walls is disinclined to becoming liberated. Therefore, the sorptively bound water will almost not be liberated by natural drying, or at least be liberated very slowly, only, which means that the boards are inclined to stabilzing exactly at this desirable degree of moisture. Natural drying is therefore inclined to produce exactly the drying degree desirable if the boards are allowed sufficient time. By a continuous process there is of course a need for comparatively large storage facilities to allow for a drying time of 5–7 days, but on the other hand, such storage facilities could be established rather cheaply.

Figure 11:
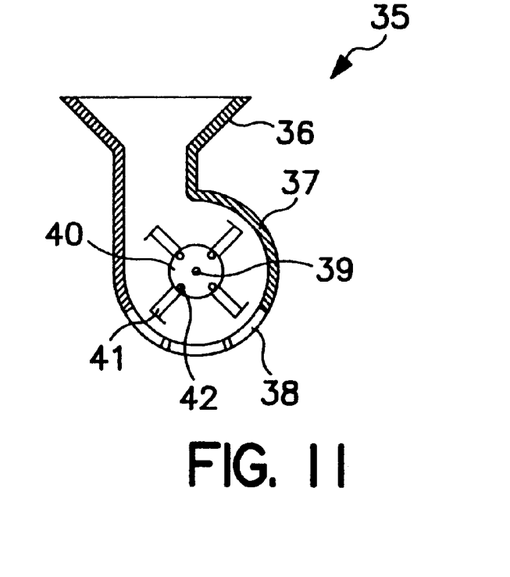
FIG. 11 shows a side elevation of the hammer mill.

Now reference is made to FIG. 11 for a more detailed description of the hammer mill. The hammer mill 35, which is used for crushing of raw material in solid form in the so-called drying process mainly comprises a charging funnel 36 through which the material is supplied, and from where the material is conveyed to the compartment within the outer shell 37, from where the material after mechanical processing can be taken out through sieve 38. The means for mechanical processing mainly comprises a motor driven shaft 39 with a rotor constructed from hubplates 40 in which are mounted a number of axes with parallel stroke axles 42 each carrying a number of separately pivotable hammers or strokes 41. The driving shaft 39 rotates at a speed of approx. 2,900 rev./min. whereby the strokes are kept stretched radially by the centrifugal forces, in that the ends of the strokes move at a circumferential speed of approx. 80 m/sec. in a radius of 260 m and at a speed of 2,900 rev./min.

Figure 1:
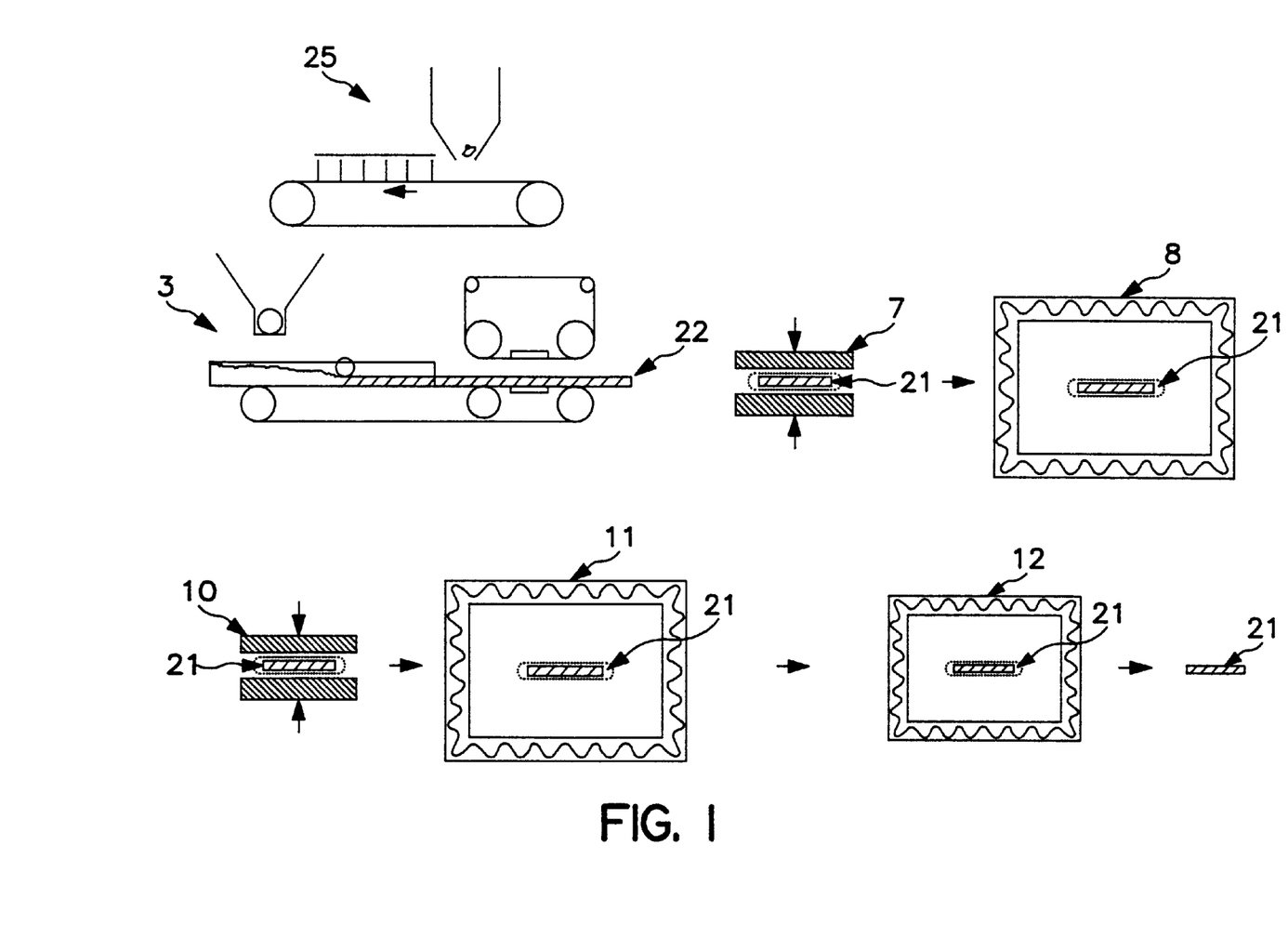
FIG. 1 shows a key diagram of the so called wet process.

Now reference is made to FIG. 1 for a more detailed description of the total so-called wet process. FIG. 1 shows in a symbolic sketch the most important treatment stages the raw material passes unto the finished board whereby certain practical details have been left out of FIG. 1 for the sake of clarity.

FIG. 1 shows, therefore, the draining unit 25, charging funnel 116 at the filter belt press, the filter belt press 3, the cutting system 4, the press I 7, the kiln I 8, press II 10, the kiln II 11, and the cooling tunnel 12.

The raw material treated in the so-called wet process which is represented in FIG. 1, is an aqueous suspension having a solid content of approx. 1–5 weight % and particularly around 2 weight %. The raw material results as a remainder in a not shown process for processing of recoverable wastepaper of good qualities. By that process, quality paper is received such as office paper and others possibly in the form of cuttings, which paper mainly contains a fibrous paper pulp with fillers which have been admixed e.g. in order to make the paper white and to secure a better print quality. As it is a matter of waste paper, it will normally contain printing ink. The main substance contains fibres of cellulose and hemicellulose, and the fillers mainly contain chalk, clay and kaolin. The waste paper is treated with water, heat, chemicals, and is treated mechanically so that a fluid paper mass or pulp mass is produced, which is taken through a flotation system where the printing ink is washed out.

The washed pulp mass is filtered in order to reclaim all the fibres suitable for a reproduction of quality paper. It is, supposed that these filtration systems can normally extract all fibres having a length of more than approx. 1 mm. Raw material which was used for production of boards according to the invention was analysed with regard to fibre length whereby it has turned out that approx. 75% of the fibres, calculated by weight, have lengths within the interval of 0–1 mm, and that approx. 92% of the fibres, calculated by weight, have the lengths within the interval of 0–2 mm. Although there may by the invention be obtained moulded bodies having good strength, on the basis of the mentioned raw material without extraordinary additives, it is of course also possible to add substances with a view to obtaining particular properties. Those might for instance be longer fibres, fibres of other sorts, binding agents, etc.

During the manufacturing process or the process treating the waste water flocculating agents may be added, which are viscosity controlling so that the solid components will better precipitate or be filtered out. These flocculating agents may for instance be a cationic solution of polyacrylamide. The suspension which becomes a residue from paper production, is the raw material used in the process of FIG. 1. The solid components in the raw material comprise as far as approx. one half is concerned short cellulose fibres and the other half chalk, caolin and clay and others which mainly exist on a colloid basis.

This thin suspension is drained in the draining unit 25 and is passed on to the filter belt press which further drains the material. The filter belt press produces a coherent mat having an aqueous content of approx. 35–60% and particularly 40–50%.

After the filter belt press, the continuous length is cut up into board bodies of a size that can be practically handled in the plant, preferably 1.3×2.6 m corresponding to approx. 4×8". These boards are taken into press I separately or in pairs, where they are compressed at a pressure of approx. 35–50 kp/cm² this pressure being maintained for a period 1l–2 min. The water content in the board bodies is thereby reduced to approx. 38–41%.

From press I, the boards are separately or in pairs taken into kiln I where they are dryed at 200° C. for a period within the interval 1-1 hour. After kiln I the board body contains approx. 20% water.

After drying in kiln I, the boards are taken into press II where they are further pressed at a pressure of approx. 35–50 kp/cm² the pressure being maintained for approx. 1 min. Thereby the water content in the boards is reduced to approx. 16%.

After pressing in press II, the boards are taken into kiln II where they are dryed at a temperature of approx. 200–220° C. and for a period of approx. 30–50 min., preferably approx. 40 min. After this, the water content of the boards has been reduced to approx. 3%, and the boards are prepared for the final treament, as e.g. cutting into dimensions required, and surface finishing.

According to a particularly preferred embodiment, kiln II is arranged so as to dry the boards more or less without demolishing the hemicellulose, whereas after kiln 2 a specific hardener kiln (not shown) is foreseen, in which the boards are exposed to higher temperature with a view to demolishing the hemicellulose. The hardener kiln may contain planes which may be heated to rather high temperature i.e. 200–350° C. and preferably approx. 300° C. in that the board bodies are pressed between two heated planes of this type for a period of e.g. 5 min.

The finished boards have a bending strength of approx. 4.8–6 N/mm² and a density of approx. 1.1 g/cm3. If the boards according to the invention are compared to particle boards, it will be noticed that the new boards have less strength but that they are advantageous in that they do not contain solvents or binding agents, that they are incombustible, that they do not liberate damaging or toxic gasses upon burning, that they are not particularly moisture absorbing, and that they are dimensionally stable also when exposed to moisture. At the same time the boards according to the invention solve the problem of disposal of a waste product. Compared to plaster boards, the boards according to the invention are characterized by advantageous properties regarding strength, moisture absorption, swelling, clinched and riveted, dimensional stability, and mechanical workability.

Figure 2:
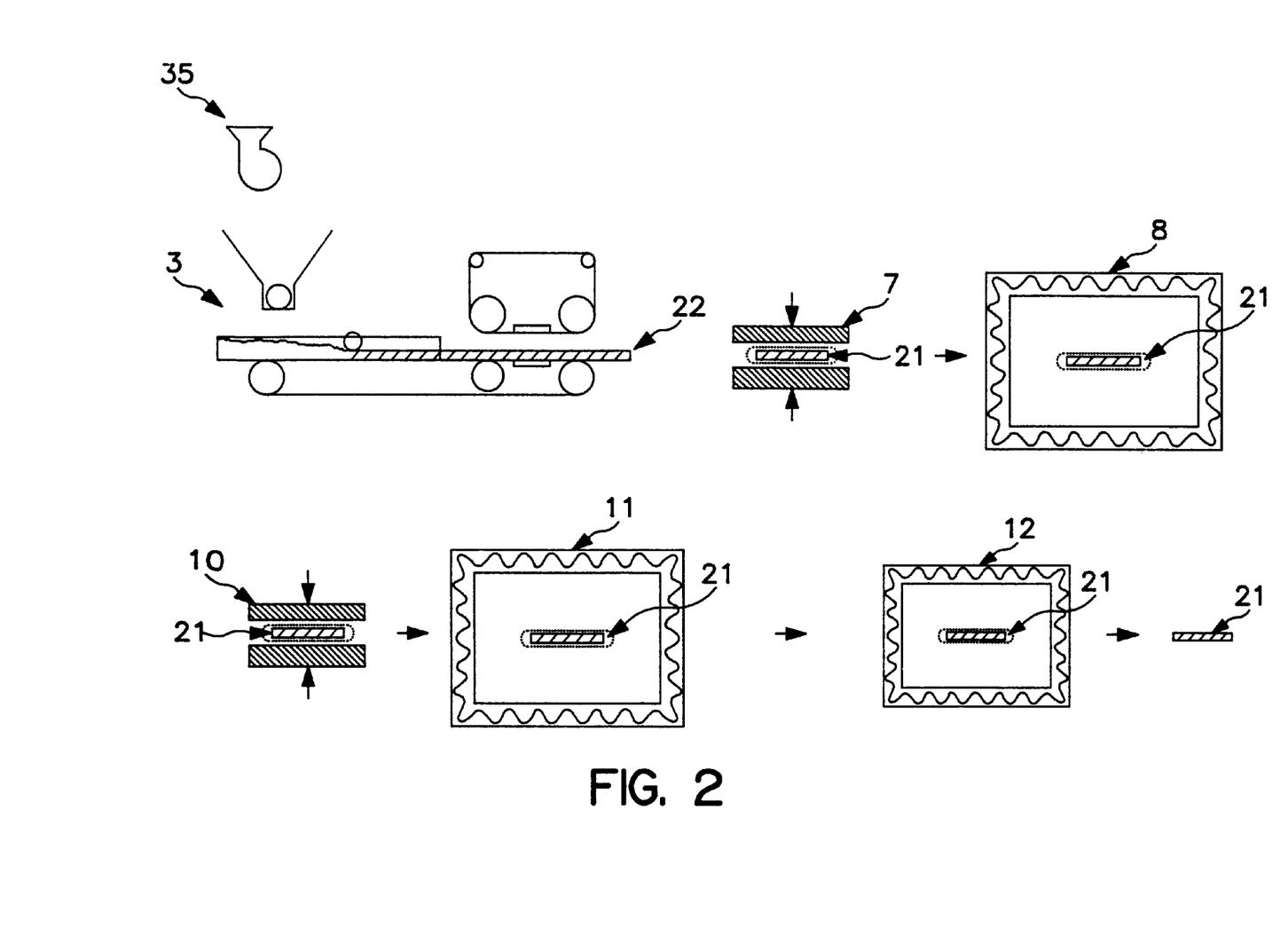
FIG. 2 shows a key diagram of the so called dry process.

Now reference is made to FIG. 2 for a more detailed description of the so-called drying process. FIG. 2 shows, like FIG. 1, only the main elements of the plant, as certain practical details are not mentioned to make the figure more clear.

FIG. 2 shows in this way the hammer mill 35, the charging funnel 116, the filter belt press 3, the cutting station 4, the press I 7, the kiln I 8, the press II 10, the kiln II 11, and the cooling tunnel 12. As raw material in the so-called drying process according to FIG. 2, the same raw material is used as in the so-called wet process, but after it has gone through a particular dewatering operation. This particular dewatering operation mainly comprises a draining unit of the same kind as draining unit 25, and a filter belt press which is slightly different from the filter belt, namely of a construction in where an upper and a lower filter belt are pressed against each other at high pressure between the rollers, while the filter belts follow a zigzag course through the filter belt press. Thereby is obtained an intensive mechanical processing which reduces the water content of the material to around 50% whereby the starting material is delivered in the form of loosely coherent irregular flakes. This flake material having a water content of 50% is in the drying process passed down into the hammer mill which crushes the material whereupon the material through the charging funnel 116 is spread on the conveyor of the filter belt press 3 for further treatment. All treatment stages from the charging funnel 116 and the filter belt press 3 and further on correspond exactly to the corresponding stages according to FIG. 1, for which reason reference is made to the explanation which is given to FIG. 1.

Although in the preferable embodiment a hammer mill is used for crushing the flake material, there may in other embodiments be used other arrangements for crushing the material e.g. grinding plants, grinding rollers, shredders, crushers and others.

EXAMPLE 1

A raw material having a solid matter content of 2% was treated by the process according to FIG. 1. The material was spread in the filter belt press in a layer of 70 mm thickness and was compressed in the filter belt press at a pressure up till 25 kp/cm² whereby a mat of 20 mm thickness was produced and having a water content of approx. 50%. The mat was cut into separate board bodies which were pressed for 1.5 min. in press I at a pressure of 35 kp/cm² whereby the moisture content was reduced to approx. 40% and the thickness to 15 mm. After that, the boards were dried at 200° C. for 1 hour in kiln I whereupon the thickness had been reduced to 14 mm and the moisture content to approx. 20%.

The boards were subsequently compressed in press II at 35 kp/cm² for 1 min. to a thickness of 12 mm and a moisture content of approx. 18% and dried in kiln II at 220° C. for 40 min.

The resulting boards had a moisture content of 1.7% and a bending strength of 6.1 N/mm², and a density of 1.13 g/cm3.

EXAMPLE 2

A raw material having a water content of 50% was treated according to the process of FIG. 2 in that the material was crushed in the hammer mill and spread in the filter belt press in a layer of approx. 40 mm thickness and compressed at 25 kp/cm². Thereupon the thickness of the mat was approx. 20 mm and the moisture content approx. 41%. After the cutting the board bodies were compressed in press I at 50 kp/cm² for 2 minutes whereupon the thickness was 15 mm and the moisture percentage approx. 35%. The boards were thereupon dried in kiln I at 200° C. for 1 hour to a moisture content of approx. 20% and a thickness of 14 mm, and compressed in press II at 50 kp/cm² for 1 min. to a thickness of 12 mm and a moisture content of 18%. Thereupon the boards were dried in kiln II at 220° C. for 40 min.

The resulting board had a moisture content of 2.5%, a bending strength of 4.8 N/mm², and a density of 1.08 g/cm3.

Although the plant and the method have been described consecutively, this should not exclude separate parts thereof from being used in other connections and being individually patentable. The above explanation should by the way only serve as an illustrating exemplification and not as a limitation the invention, as other variations and modifications thereof are possible within the limits of the accompanying claims.

What is claimed is:

1. A method for manufacturing a molded body, comprising the steps of:
    providing a raw material consisting essentially of waste material resulting from the reprocessing of paper products to manufacture recycled paper,
    pressing said raw material in a first pressing step at ambient temperature between at least two filter belts,
    drying said pressed raw material through one or both of heating and natural drying in a first drying step until practically all free water has been removed from the pressed material whereas the water in the fibre walls of the cellulose fibres contained in the pressed material is essentially retained,
    pressing the resulting material into a desired shape in a second pressing step without application of heat to the material, and
    drying the material at elevated temperature in a second drying step to result in said molded body.

2. The method of claim 1, wherein the short cellulose fibers include a major portion of fibers having a length of less than about 1 mm.

3. The method of claim 1, wherein the first drying step comprises ventilated heating of the pressed raw material at a temperature of up to about 240° C.

4. The method of claim 3, wherein the first drying step comprises ventilated heating of the pressed raw material at a temperature in the range of 160–240° C.

5. The method of claim 4, wherein the first drying step comprises ventilated heating of the pressed raw material at a temperature in the range of 200–220° C.

6. The method of claim 1, wherein the first drying step is carried out for a period of time sufficient to result in a water content in the pressed raw material of 20–35% based on the dry weight of the cellulose fibers.

7. The method of claim 6, wherein the first drying step is carried out for a period of time sufficient to result in a water content in the pressed raw material of 25–30% baked on the dry weight of the cellulose fibers.

8. The method of claim 1, wherein the first drying step comprises drying at ambient temperature.

9. The method of claim 1, wherein the second drying step comprises drying at a temperature of up to about 240° C.

10. The method of claim 9, wherein the second drying step comprises drying at a temperature in the range of 160–240° C.

11. The method of claim 10, wherein the second drying step comprises drying at a temperature in the range of 200–220° C.

12. The method of claim 1, wherein the second drying step is carried out for a period of time sufficient to result in a water content in the material of about 3–4% based on the dry weight of the cellulose fibers.

13. The method of claim 1, further comprising, after the second drying step, a heat treatment step wherein the molded body is treated at a temperature in the range of 200–350° C.

* * * * *